(12) United States Patent
Witkowski et al.

(10) Patent No.: US 9,964,245 B2
(45) Date of Patent: May 8, 2018

(54) SWIVEL JOINT WITH UNIFORM BALL BEARING REQUIREMENTS

(71) Applicant: S.P.M. Flow Control, Inc., Fort Worth, TX (US)

(72) Inventors: Brian Witkowski, Weatherford, TX (US); Mark D. Matzner, Burleson, TX (US)

(73) Assignee: S.P.M. Flow Control, Inc., Fort Worth, TX (US)

( * ) Notice: Subject to any disclaimer, the term of this patent is extended or adjusted under 35 U.S.C. 154(b) by 541 days.

(21) Appl. No.: 14/524,704

(22) Filed: Oct. 27, 2014

(65) Prior Publication Data
US 2015/0042088 A1 Feb. 12, 2015

Related U.S. Application Data

(63) Continuation of application No. 12/165,680, filed on Jul. 1, 2008, now Pat. No. 8,870,233.
(Continued)

(51) Int. Cl.
*F16C 19/08* (2006.01)
*F16L 27/08* (2006.01)
*F16C 43/06* (2006.01)

(52) U.S. Cl.
CPC .......... *F16L 27/0828* (2013.01); *F16C 19/08* (2013.01); *F16C 43/06* (2013.01);
(Continued)

(58) Field of Classification Search
CPC ...... F16C 19/08; F16C 43/06; F16C 2361/00; F16C 2240/84; F16L 27/0845; F16L 27/0828; F16L 27/0824
See application file for complete search history.

(56) References Cited

U.S. PATENT DOCUMENTS 345,420 A 7/1886 Eskholme et al.
375,464 A 12/1887 Thacher et al.
(Continued)

FOREIGN PATENT DOCUMENTS

AU 1320088 A 9/1988
AU 649744 B2 6/1994
(Continued)

OTHER PUBLICATIONS

Chinese Office Action dated Nov. 18, 2016 by SIPO, re App. No. 201380054054, 13 pages.
(Continued)

*Primary Examiner* — David Bochna
*Assistant Examiner* — James A Linford
(74) *Attorney, Agent, or Firm* — Gardere Wynne Sewell LLP

(57) ABSTRACT

A swivel joint has uniform ball bearing requirements for all bearing races. The swivel joint has a male connector and a female connector that coaxially interconnects and swivel relative to each other while still maintaining a high pressure seal. Each connector has three bearing races to form three sets of bearing races, each of which supports the same number of ball bearings. The circumference of the main set of races are enlarged by less than the diameter of one ball, so it is impossible to add another ball to the coupled male and female connectors of the swivel joint.

20 Claims, 4 Drawing Sheets

Related U.S. Application Data

(60) Provisional application No. 60/947,738, filed on Jul. 3, 2007.

(52) U.S. Cl.
CPC ...... *F16L 27/0845* (2013.01); *F16C 2240/84* (2013.01); *F16C 2361/00* (2013.01)

(56) References Cited

U.S. PATENT DOCUMENTS

| | | |
|---|---|---|
| 580,226 A | 4/1897 | Sanford |
| 741,477 A | 10/1903 | Flinn |
| 1,201,022 A | 10/1916 | Conniff |
| 1,379,092 A | 5/1921 | Fraccascia |
| 1,452,603 A | 4/1923 | Himes |
| 1,473,634 A | 11/1923 | Loudon |
| 1,483,001 A | 2/1924 | Kurre |
| 1,488,211 A | 3/1924 | Loeffler |
| 1,543,637 A | 6/1925 | Woll |
| 1,607,463 A | 11/1926 | Kent |
| 1,664,493 A | 4/1928 | Smith |
| 1,675,808 A | 7/1928 | Kliss |
| 1,764,936 A | 6/1930 | Dean |
| 1,798,498 A | 3/1931 | Riley |
| D86,952 S | 5/1932 | Garrison et al. |
| 1,889,256 A | 11/1932 | Lipscomb |
| 1,990,090 A | 2/1935 | Packard |
| 2,197,320 A | 4/1940 | Shenton |
| 2,310,583 A | 2/1943 | Johnson |
| 2,310,813 A | 2/1943 | Sellmeyer |
| 2,339,287 A | 1/1944 | Neef, Jr. |
| 2,354,161 A | 7/1944 | Waterman |
| 2,361,881 A | 10/1944 | Sheppard |
| 2,391,266 A | 12/1945 | Parker |
| 2,404,142 A | 7/1946 | Parker |
| D150,466 S | 8/1948 | Schuler |
| 2,506,162 A | 5/1950 | Metzgar |
| 2,576,431 A | 11/1951 | White |
| 2,587,212 A | 2/1952 | Placette |
| 2,589,144 A | 3/1952 | Russell et al. |
| 2,606,068 A | 8/1952 | Bonacor |
| 2,612,340 A | 9/1952 | Laurent |
| 2,663,458 A | 12/1953 | Macglashan |
| 2,694,503 A | 11/1954 | Young |
| 2,717,001 A | 9/1955 | Perrault |
| 2,746,773 A | 5/1956 | Bily |
| 2,766,999 A | 10/1956 | Watts |
| 2,795,459 A | 6/1957 | Cornelius |
| 2,923,317 A | 2/1960 | McInerney |
| 2,925,827 A | 2/1960 | Anderson et al. |
| 2,969,492 A | 1/1961 | Wheatley et al. |
| 3,024,047 A | 3/1962 | Schmohl |
| 3,060,961 A | 10/1962 | Conley |
| 3,061,267 A | 10/1962 | Hamer et al. |
| 3,064,940 A | 11/1962 | Anderson |
| 3,072,379 A | 1/1963 | Hamer |
| 3,108,939 A | 10/1963 | Sabins et al. |
| 3,113,792 A | 12/1963 | Brown |
| 3,150,681 A | 9/1964 | Hansen |
| 3,160,426 A | 12/1964 | Faeser |
| 3,194,589 A | 7/1965 | Kahlbau et al. |
| 3,204,484 A | 9/1965 | Gustafson et al. |
| 3,216,746 A | 11/1965 | Watts |
| 3,228,334 A | 1/1966 | Oss |
| 3,238,687 A | 3/1966 | Tisbo |
| 3,241,567 A | 3/1966 | Pusch |
| 3,294,425 A | 12/1966 | Franck |
| 3,341,232 A | 9/1967 | Deakins |
| 3,343,802 A | 9/1967 | Schuilwerve |
| 3,346,002 A | 10/1967 | Thompson, Jr. et al. |
| 3,357,679 A | 12/1967 | Gulick |
| 3,403,931 A | 10/1968 | Crain |
| 3,404,698 A | 10/1968 | Dorch |
| 3,425,661 A | 2/1969 | Mayo |
| 3,439,897 A | 4/1969 | Priese |
| 3,455,534 A | 7/1969 | Scaramucci |
| 3,467,224 A | 9/1969 | Curtis |
| 3,472,479 A | 10/1969 | Sherwood |
| 3,554,581 A | 1/1971 | Mason |
| 3,556,474 A | 1/1971 | Scaramucci |
| 3,561,727 A | 2/1971 | Scaramucci |
| 3,571,896 A | 3/1971 | Wilkerson |
| 3,594,835 A | 7/1971 | Wilson |
| 3,630,483 A | 12/1971 | Canalizo |
| 3,680,188 A | 8/1972 | Mason et al. |
| 3,687,415 A | 8/1972 | Turkot |
| 3,712,585 A | 1/1973 | Grenier |
| 3,726,314 A | 4/1973 | Moen |
| 3,789,872 A | 2/1974 | Elliott |
| 3,813,733 A | 6/1974 | Flohr |
| 3,830,306 A | 8/1974 | Brown |
| 3,840,048 A | 10/1974 | Moen |
| 3,845,876 A | 11/1974 | Needham et al. |
| 3,845,879 A | 11/1974 | Dernbach et al. |
| 3,881,480 A | 5/1975 | LaFourcade |
| 3,894,718 A | 7/1975 | Koch et al. |
| 3,901,259 A | 8/1975 | Banbury |
| 3,916,950 A | 11/1975 | Mongerson et al. |
| 3,933,172 A | 1/1976 | Allen |
| 3,934,608 A | 1/1976 | Guyton |
| 3,937,240 A | 2/1976 | Nanny |
| 3,942,551 A | 3/1976 | Schuller et al. |
| 3,967,842 A | 7/1976 | Kendrick |
| 3,972,364 A | 8/1976 | Brumm |
| 3,974,848 A | 8/1976 | Wheatley |
| 4,022,427 A | 5/1977 | Read |
| 4,027,696 A | 6/1977 | Guyton |
| 4,046,164 A | 9/1977 | Pool |
| 4,059,872 A | 11/1977 | Delesandri |
| 4,085,770 A | 4/1978 | Woronowicz |
| 4,086,803 A | 5/1978 | Wheeler |
| 4,093,180 A | 6/1978 | Strabala |
| 4,109,714 A | 8/1978 | Greenlee et al. |
| 4,113,228 A | 9/1978 | Frye |
| 4,146,047 A | 3/1979 | Wood et al. |
| 4,150,847 A | 4/1979 | De Cenzo |
| 4,158,510 A | 6/1979 | Smith et al. |
| 4,171,095 A | 10/1979 | Filan et al. |
| 4,218,080 A | 8/1980 | Kendrick |
| 4,221,204 A | 9/1980 | Meyer |
| 4,254,793 A | 3/1981 | Scaramucci |
| 4,261,387 A | 4/1981 | Cohn |
| 4,274,434 A | 6/1981 | Hafele |
| 4,286,621 A | 9/1981 | Glahn |
| 4,308,916 A | 1/1982 | Fritz, Jr. |
| 4,321,945 A | 3/1982 | Chabat-Courrede |
| 4,327,768 A | 5/1982 | Behle |
| 4,332,370 A | 6/1982 | Williams |
| 4,338,707 A | 7/1982 | Byerly |
| 4,367,571 A | 1/1983 | Speirs et al. |
| 4,378,849 A | 4/1983 | Wilks |
| 4,399,830 A | 8/1983 | Brodie |
| 4,445,255 A | 5/1984 | Olejak |
| 4,448,148 A | 5/1984 | Gain, Jr. |
| 4,478,388 A | 10/1984 | George |
| 4,485,530 A | 12/1984 | Begley et al. |
| 4,485,843 A | 12/1984 | Wolff |
| 4,497,344 A | 2/1985 | Kisiel |
| 4,501,291 A | 2/1985 | Siegrist |
| 4,506,696 A | 3/1985 | Von Pechmann |
| 4,511,120 A | 4/1985 | Conley et al. |
| 4,524,599 A | 6/1985 | Bailey |
| 4,531,542 A | 7/1985 | Looney |
| 4,572,237 A | 2/1986 | Thompson |
| 4,590,957 A | 5/1986 | McFarlane |
| 4,597,505 A | 7/1986 | Mozley et al. |
| 4,605,036 A | 8/1986 | Smith et al. |
| 4,616,803 A | 10/1986 | Schils |
| 4,634,154 A | 1/1987 | Arora et al. |
| 4,662,603 A | 5/1987 | Etheridge |
| 4,667,570 A | 5/1987 | Jensen, Jr. et al. |
| 4,705,306 A | 11/1987 | Guido et al. |
| 4,716,930 A | 1/1988 | Richmond et al. |
| 4,732,215 A | 3/1988 | Hopper |

(56) References Cited

U.S. PATENT DOCUMENTS

| | | |
|---|---|---|
| 4,836,240 A | 6/1989 | Elliott |
| 4,842,014 A | 6/1989 | Strelow et al. |
| 4,848,398 A | 7/1989 | Leach |
| 4,850,392 A | 7/1989 | Crump et al. |
| 4,864,696 A | 9/1989 | Mittermaier et al. |
| 4,896,367 A | 1/1990 | Newton et al. |
| 4,915,418 A | 4/1990 | Palatchy |
| 4,969,482 A | 11/1990 | Perrin et al. |
| 4,993,489 A | 2/1991 | McLeod |
| 5,025,865 A | 6/1991 | Caldwell et al. |
| 5,046,525 A | 9/1991 | Powell |
| 5,056,548 A | 10/1991 | Mills |
| 5,143,112 A | 9/1992 | Scaramucci |
| 5,161,566 A | 11/1992 | Scaramucci |
| 5,161,570 A | 11/1992 | Scaramucci |
| 5,165,478 A | 11/1992 | Wilson |
| 5,178,185 A | 1/1993 | Stehling et al. |
| 5,199,464 A | 4/1993 | Savard |
| 5,307,835 A | 5/1994 | Scaramucci |
| 5,341,840 A | 8/1994 | Manson et al. |
| 5,386,847 A | 2/1995 | Scaramucci |
| 5,417,402 A | 5/1995 | Speybroeck |
| D360,728 S | 7/1995 | Nozaki |
| 5,439,027 A | 8/1995 | Layton et al. |
| 5,441,072 A | 8/1995 | Indey et al. |
| 5,443,088 A | 8/1995 | Hoch et al. |
| 5,462,413 A | 10/1995 | Schroeder |
| 5,477,752 A | 12/1995 | West et al. |
| 5,507,533 A | 4/1996 | Mumma |
| 5,522,420 A | 6/1996 | Martin |
| 5,526,883 A | 6/1996 | Breaux |
| 5,538,296 A | 7/1996 | Horton |
| 5,544,675 A | 8/1996 | Dean |
| 5,584,315 A | 12/1996 | Powell |
| 5,603,485 A | 2/1997 | Schwarz |
| 5,676,348 A | 10/1997 | Ungchusri et al. |
| 5,685,334 A | 11/1997 | Hagan |
| 5,689,862 A | 11/1997 | Hayes et al. |
| 5,755,427 A | 5/1998 | Koskinas |
| 5,787,926 A | 8/1998 | Mukumoto et al. |
| 5,791,693 A | 8/1998 | Crawford |
| 5,832,947 A | 11/1998 | Niemczyk |
| 5,947,152 A | 9/1999 | Martin et al. |
| 5,957,592 A | 9/1999 | Yamanaka |
| 5,971,007 A | 10/1999 | Harcourt et al. |
| 5,983,826 A | 11/1999 | Lohde |
| 6,003,837 A | 12/1999 | Raymond, Jr. et al. |
| 6,029,693 A | 2/2000 | Nakanishi et al. |
| 6,079,439 A | 6/2000 | Hartley |
| 6,082,707 A | 7/2000 | Hosie et al. |
| 6,085,572 A | 7/2000 | McGuire, Sr. et al. |
| 6,089,531 A | 7/2000 | Young |
| 6,155,091 A | 12/2000 | Hayes et al. |
| 6,164,707 A | 12/2000 | Ungchusri et al. |
| 6,209,561 B1 | 4/2001 | Kugelev et al. |
| 6,230,733 B1 | 5/2001 | Strelow et al. |
| 6,240,951 B1 | 6/2001 | Yori |
| 6,250,605 B1 | 6/2001 | Young |
| 6,290,237 B1 | 9/2001 | Graupner |
| 6,361,051 B1 | 3/2002 | Babin |
| 6,371,527 B1 | 4/2002 | Ungchusri et al. |
| 6,382,247 B1 | 5/2002 | Gundry |
| 6,387,226 B1 | 5/2002 | Persson |
| 6,450,477 B1 | 9/2002 | Young |
| 6,554,024 B2 | 4/2003 | Mefford et al. |
| 6,554,249 B2 | 4/2003 | Pang et al. |
| 6,742,538 B1 | 6/2004 | Aderholt et al. |
| 6,752,377 B1 | 6/2004 | Taylor et al. |
| 6,770,177 B2 | 8/2004 | Keller et al. |
| 6,843,265 B2 | 1/2005 | Taylor |
| 6,848,724 B2 | 2/2005 | Kessler |
| 6,854,704 B1 | 2/2005 | Young |
| 6,880,567 B2 | 4/2005 | Klaver et al. |
| 6,880,568 B1 | 4/2005 | Taylor |
| 6,886,593 B2 | 5/2005 | Madden et al. |
| 6,945,569 B1 | 9/2005 | Diaz et al. |
| 6,948,526 B2 | 9/2005 | Seder et al. |
| 6,954,569 B2 | 10/2005 | Yang |
| 6,978,799 B2 | 12/2005 | Kugelev et al. |
| 7,004,445 B2 | 2/2006 | Lymberopoulos |
| 7,028,778 B2 | 4/2006 | Krywitsky |
| 7,028,986 B2 | 4/2006 | Young |
| 7,204,525 B2 | 4/2007 | Matzner |
| RE39,695 E | 6/2007 | Ungchusri et al. |
| 7,228,869 B2 | 6/2007 | Wilhelm |
| D549,850 S | 8/2007 | Perlman |
| 7,264,059 B2 | 9/2007 | Akselberg |
| 7,285,190 B2 | 10/2007 | Martin, Jr. |
| 7,302,961 B2 | 12/2007 | Martin et al. |
| D570,501 S | 6/2008 | Janesz et al. |
| 7,398,796 B2 | 7/2008 | Hjorth et al. |
| 7,401,819 B2 | 7/2008 | Gibb et al. |
| 7,451,959 B2 | 11/2008 | Matzner |
| 7,458,212 B2 | 12/2008 | Koizumi et al. |
| 7,516,941 B2 | 4/2009 | Combs |
| 7,549,681 B1 | 6/2009 | Matzner |
| 7,677,526 B2 | 3/2010 | Lymberopoulos |
| 7,819,386 B2 | 10/2010 | Combs |
| 7,823,265 B2 | 11/2010 | Matzner et al. |
| 7,890,276 B2 | 2/2011 | Killion et al. |
| 7,950,409 B2 | 5/2011 | Stokes et al. |
| 8,000,909 B2 | 8/2011 | Danzy |
| 8,051,875 B2 | 11/2011 | Edwards |
| D660,461 S | 5/2012 | Kotin |
| D660,984 S | 5/2012 | Kotin et al. |
| 8,196,229 B1 | 6/2012 | Hickok |
| D666,326 S | 8/2012 | Sims |
| 8,261,771 B2 | 9/2012 | Witkowski et al. |
| D675,750 S | 2/2013 | King |
| 8,376,046 B2 | 2/2013 | Broussard, II |
| 8,465,001 B2 | 6/2013 | Witkowski et al. |
| 8,469,108 B2 | 6/2013 | Kajaria et al. |
| 8,474,521 B2 | 7/2013 | Kajaria et al. |
| 8,490,949 B2 | 7/2013 | Lanning et al. |
| D703,294 S | 4/2014 | Witkowski et al. |
| D707,332 S | 6/2014 | Witkowski et al. |
| D707,797 S | 6/2014 | Wilkowski et al. |
| 8,833,804 B2 | 9/2014 | Myers et al. |
| 8,870,233 B2 | 10/2014 | Matzner et al. |
| 8,998,168 B2 | 4/2015 | Witkowski et al. |
| D734,434 S | 7/2015 | Witkowski et al. |
| 9,103,448 B2 | 8/2015 | Witkowski et al. |
| 2002/0179876 A1 | 12/2002 | Pang et al. |
| 2002/0185867 A1 | 12/2002 | Stachowiak |
| 2002/0186910 A1 | 12/2002 | Maret |
| 2003/0047944 A1 | 3/2003 | Ungchusri et al. |
| 2003/0178067 A1 | 9/2003 | Fredrickson et al. |
| 2004/0163716 A1 | 8/2004 | Madden et al. |
| 2005/0087232 A1 | 4/2005 | Kugelev et al. |
| 2005/0121073 A1 | 6/2005 | Carroll |
| 2005/0199286 A1 | 9/2005 | Appleford et al. |
| 2006/0091339 A1 | 5/2006 | Young |
| 2006/0185731 A1 | 8/2006 | Grable et al. |
| 2006/0266422 A1 | 11/2006 | Feenstra et al. |
| 2006/0278394 A1 | 12/2006 | Stover |
| 2006/0283513 A1 | 12/2006 | Kurian et al. |
| 2007/0029090 A1 | 2/2007 | Andreychuk et al. |
| 2007/0051411 A1 | 3/2007 | Scaramucci et al. |
| 2007/0205387 A1 | 9/2007 | Grau et al. |
| 2007/0262029 A1 | 11/2007 | Yoshida et al. |
| 2007/0272308 A1 | 11/2007 | Spears et al. |
| 2008/0039802 A1 | 2/2008 | Vangsness et al. |
| 2008/0054204 A1 | 3/2008 | Zhou |
| 2008/0142752 A1 | 6/2008 | Matzner |
| 2008/0196773 A1 | 8/2008 | Franconi |
| 2008/0264649 A1 | 10/2008 | Crawford |
| 2008/0295910 A1 | 12/2008 | Aleksandersen et al. |
| 2008/0308159 A1 | 12/2008 | Stunkard |
| 2009/0120635 A1 | 5/2009 | Neal |
| 2010/0154894 A1 | 6/2010 | Kotapish et al. |
| 2010/0193057 A1 | 8/2010 | Garner et al. |
| 2010/0258200 A1 | 10/2010 | Walker et al. |
| 2010/0288493 A1 | 11/2010 | Fielder et al. |
| 2010/0326541 A1 | 12/2010 | Kugelev et al. |

(56) References Cited

U.S. PATENT DOCUMENTS

| | | |
|---|---|---|
| 2011/0036415 A1 | 2/2011 | Lymberopoulos |
| 2011/0061871 A1 | 3/2011 | Omvik |
| 2011/0240126 A1 | 10/2011 | Lymberopoulos et al. |
| 2011/0272158 A1 | 11/2011 | Neal |
| 2011/0316274 A1 | 12/2011 | Gronlund et al. |
| 2012/0025114 A1 | 2/2012 | Lymberopoulos et al. |
| 2012/0031494 A1 | 2/2012 | Lymberopoulos |
| 2012/0060929 A1 | 3/2012 | Kendrick |
| 2012/0073670 A1 | 3/2012 | Lymberopoulos |
| 2012/0085541 A1 | 4/2012 | Love et al. |
| 2012/0091743 A1 | 4/2012 | Ohman, III et al. |
| 2012/0181013 A1 | 7/2012 | Kajaria et al. |
| 2012/0181015 A1 | 7/2012 | Kajaria et al. |
| 2012/0181016 A1 | 7/2012 | Kajaria et al. |
| 2012/0181046 A1 | 7/2012 | Kajaria et al. |
| 2012/0219354 A1 | 8/2012 | Bauer et al. |
| 2012/0227983 A1 | 9/2012 | Lymberopoulos et al. |
| 2012/0255734 A1 | 10/2012 | Coli et al. |
| 2012/0298213 A1 | 11/2012 | Forster et al. |
| 2012/0325332 A1 | 12/2012 | Ball et al. |
| 2013/0000745 A1 | 1/2013 | Witkowski et al. |
| 2013/0020519 A1 | 1/2013 | Lymberopoulos |
| 2013/0037125 A1 | 2/2013 | Drake et al. |
| 2013/0126152 A1 | 5/2013 | Banks et al. |
| 2013/0248182 A1 | 9/2013 | Chong et al. |
| 2013/0328301 A1 | 12/2013 | McGuire |
| 2014/0048158 A1 | 2/2014 | Baca et al. |
| 2014/0048255 A1 | 2/2014 | Baca et al. |
| 2014/0048734 A1 | 2/2014 | Witkowski et al. |
| 2015/0000766 A1 | 1/2015 | Arizpe et al. |
| 2015/0345646 A1 | 12/2015 | Witkowski et al. |
| 2016/0161956 A1 | 6/2016 | Baca et al. |

FOREIGN PATENT DOCUMENTS

| | | | |
|---|---|---|---|
| AU | 348253 | 5/2013 | |
| CA | 2350047 A1 | 12/2001 | |
| CA | 2635751 A1 | 12/2001 | |
| CA | 2485817 A1 | 4/2005 | |
| CA | 2490664 A1 | 10/2005 | |
| CA | 2503231 A1 | 10/2005 | |
| CA | 2612397 A1 | 6/2008 | |
| CA | 2636751 A1 | 1/2009 | |
| CA | 2654848 A1 | 8/2010 | |
| CA | 149748 S | 11/2014 | |
| CA | 152956 S | 11/2014 | |
| CA | 152957 S | 11/2014 | |
| CA | 2764310 | 6/2015 | |
| CN | 2118877 U | 10/1992 | |
| CN | 1137309 A | 12/1996 | |
| CN | 1225298 A | 8/1999 | |
| CN | 2426550 Y | 4/2001 | |
| CN | 1548701 A | 11/2004 | |
| CN | 1908365 A | 2/2007 | |
| CN | 2901281 Y | 5/2007 | |
| CN | 200999609 Y | 1/2008 | |
| CN | 201043685 Y | 4/2008 | |
| CN | 101205798 A | 6/2008 | |
| CN | 101258350 A | 9/2008 | |
| CN | 101303033 A | 11/2008 | |
| CN | 201162522 Y | 12/2008 | |
| CN | 101367099 A | 2/2009 | |
| CN | 201206648 Y | 3/2009 | |
| CN | 201262043 Y | 6/2009 | |
| CN | 101539218 A | 9/2009 | |
| CN | 101722221 A | 6/2010 | |
| CN | 201496006 U | 6/2010 | |
| CN | 201545914 U | 8/2010 | |
| CN | 201650157 U | 11/2010 | |
| CN | 201739525 U | 2/2011 | |
| CN | 201747313 U | 2/2011 | |
| CN | 202031536 U | 11/2011 | |
| CN | 202047762 U | 11/2011 | |
| CN | 102323158 A | 1/2012 | |
| CN | 202144943 U | 2/2012 | |
| CN | 202208237 U | 5/2012 | |
| CN | 202255848 U | 5/2012 | |
| CN | 202255937 U | 5/2012 | |
| CN | 202718658 U | 2/2013 | |
| CN | ZL2013300399164 | 9/2013 | |
| CN | ZL20133044138 | 4/2014 | |
| CN | ZL201080025350.3 | 5/2014 | |
| CN | ZL201330441241.6 | 5/2014 | |
| DE | 1166571 B | 3/1964 | |
| DE | 2415732 A1 | 10/1974 | |
| DE | 2358756 A1 | 3/1975 | |
| DE | 2558272 A1 | 7/1977 | |
| DE | 2642743 A1 | 3/1978 | |
| DE | 218416 C | 2/1985 | |
| DE | 3341643 A1 | 5/1985 | |
| DE | 19707228 A1 | 8/1998 | |
| DE | 102004033453 A1 | 1/2006 | |
| EA | 201171356 A1 | 5/2012 | |
| EC | D-EU002185371-001 | 2/2013 | |
| EC | D-002307421-0001 | 9/2013 | |
| EM | 002307421-0002 | 9/2013 | |
| EP | 44619 A1 | 1/1982 | |
| EP | 1219942 A1 | 7/2002 | |
| EP | 1488867 A1 | 12/2004 | |
| EP | 2438338 A2 | 4/2012 | |
| FR | 2635476 A1 | 2/1990 | |
| FR | 2802990 A1 * | 6/2001 | ............. A63C 17/22 |
| GB | 255970 A | 8/1926 | |
| GB | 578008 A | 6/1946 | |
| GB | 619950 A | 3/1949 | |
| GB | 731895 A | 6/1955 | |
| GB | 1536728 A | 12/1978 | |
| GB | 2056626 A | 3/1981 | |
| GB | 2117822 A | 10/1983 | |
| GB | 2140338 A | 11/1984 | |
| GB | 2185287 A | 7/1987 | |
| GB | 2228885 A | 9/1990 | |
| GB | 2312728 B | 5/2000 | |
| GB | 2355510 A | 4/2001 | |
| GB | 2408562 A | 6/2005 | |
| GB | 2416574 B | 8/2008 | |
| GB | 2413606 B | 3/2009 | |
| GB | 2444822 B | 6/2011 | |
| GB | 2452801 B | 4/2012 | |
| GB | 2493900 A | 2/2013 | |
| GB | 2521300 A | 6/2015 | |
| IN | 251691 | 8/2012 | |
| JP | 53108873 A | 9/1978 | |
| JP | 53125261 A | 11/1978 | |
| JP | 57073187 | 5/1982 | |
| JP | 57079400 | 5/1982 | |
| JP | 61093344 | 5/1986 | |
| JP | 08075022 | 3/1996 | |
| JP | 08128536 | 5/1996 | |
| JP | 08291543 A | 11/1996 | |
| JP | 08300052 | 11/1996 | |
| JP | 10175026 | 6/1998 | |
| JP | 2000330646 | 11/2000 | |
| JP | 2001355774 A | 12/2001 | |
| JP | 2002098068 | 4/2002 | |
| JP | 2004190769 A | 7/2004 | |
| JP | 2006194334 A | 7/2006 | |
| JP | D1285004 | 9/2006 | |
| JP | 2008215626 A | 9/2008 | |
| JP | 4996990 B2 | 8/2012 | |
| JP | 05033883 | 9/2012 | |
| KR | 100540389 B1 | 12/2005 | |
| KR | 100540390 B1 | 12/2005 | |
| KR | 100540392 B1 | 12/2005 | |
| KR | 100621158 B1 | 8/2006 | |
| KR | 100716760 B1 | 5/2007 | |
| KR | 100832065 B1 | 5/2008 | |
| KR | 101191630 B1 | 10/2012 | |
| MX | 2011011007 A | 2/2012 | |
| MX | 2011012944 A | 6/2012 | |
| MX | 40533 | 12/2013 | |
| NL | 258255 A | 4/1964 | |
| RU | 1466084 C | 6/1995 | |
| RU | 1417281 C | 7/1995 | |

(56) References Cited

FOREIGN PATENT DOCUMENTS

| | | |
|---|---|---|
| RU | 02088831 C1 | 8/1997 |
| RU | 2242313 C2 | 12/2004 |
| RU | 2367770 C1 | 9/2009 |
| RU | 2367771 C1 | 9/2009 |
| SG | 175263 A1 | 11/2011 |
| SG | 176534 A1 | 1/2012 |
| SG | D2013186 G | 4/2013 |
| SU | 567001 A1 | 7/1977 |
| SU | 585898 A1 | 12/1977 |
| SU | 1391769 A1 | 4/1988 |
| SU | 1721368 A1 | 3/1992 |
| WO | WO-9713398 A2 | 4/1997 |
| WO | WO-9956047 A2 | 11/1999 |
| WO | WO-2009023042 A1 | 2/2009 |
| WO | WO-2010080636 A2 | 7/2010 |
| WO | WO-2010123889 A2 | 10/2010 |
| WO | WO-2010141651 A2 | 12/2010 |
| WO | WO-2010151680 A2 | 12/2010 |
| WO | WO-2011095453 A1 | 8/2011 |
| WO | WO-2013023154 A1 | 2/2013 |
| WO | WO-2014028498 A2 | 2/2014 |
| WO | WO-2014028795 A2 | 2/2014 |
| WO | WO-2014042643 A1 | 3/2014 |
| WO | WO-2015002863 A1 | 1/2015 |

OTHER PUBLICATIONS

International Search Report for Application No. PCT/US2016/37391, by ISA/US, dated Sep. 9, 2016, 2 pages.
"The Strength of Screw Threads Under Repeated Tension" by Herbert F. Moore and Proctor E. Henwood, University of Illinois Engineering Experiment Station, Bulletin No. 264, Mar. 1934 (Mar. 1934), 20 pages.
"Windlass Engineers & Services," Hammer Unions (Windglass Engineers), Mar. 11, 2015, 8 pages.
Written Opinion for Application No. PCT/US2016/37391, by ISA/US, dated Sep. 9, 2016, 8 pages.
Canadian Notice of Allowance dated Jun. 22, 2015, by the CIPO, re App No. 2636751.
Notice of Allowance dated Dec. 17, 2015, by the USPTO, re U.S. Appl. No. 13/886,771.
Notice of Allowance dated Oct. 27, 2015, by the USPTO, re U.S. Appl. No. 13/964,863.
Office Action dated Jul. 10, 2015, by the USPTO, re U.S. Appl. No. 13/964,863.
"10 Station AFAM Trailer, FMC, Oct. 28, 2011, 6 pages".
"Advisory Action dated May 20, 2013, by the USPTO, re U.S. Appl. No. 12/165,680".
"Australian Exam Report, dated Sep. 25, 2014, by IP Australia, re App No. 2010239366".
"Brazil Office Action, dated Jun. 3, 2014, re App No. BR3020130006611".
"Canadian Exam Report dated Jul. 29, 2014, issued by CIPO, re App No. 2636751".
"Canadian Examination Report, by CIPO, dated Feb. 10, 2014, re App No. 152956".
"Canadian Examination Report dated Apr. 28, 2014, by the CIPO, re App No. 2764310".
"Canadian Examination Report dated Feb. 7, 2014, by the CIPO, re App No. 149748".
"Canadian Examiner's Report dated Feb. 10, 2014, by CIPO, re App No. 152957".
"Second Written Opinion, by the IPEA/US, dated Jul. 28, 2014, re PCT/US2013/054741".
"Eurasian Office Action dated Nov. 19, 2013, by the Eurasian Patent Office, re App No. 201171356".
"European Exam Report, by the EPO, dated Apr. 8, 2014, re App No. 10784052.2".
"Final Office Action dated Apr. 25, 2014, by the USPTO, re U.S. Appl. No. 13/608,562".
"Final Office Action dated Feb. 28, 2014, by the USPTO, re U.S. Appl. No. 12/165,680".
"Final Office Action dated Jan. 31, 2012, by the USPTO, re U.S. Appl. No. 12/165,680".
"Final Office Action dated Jan. 5, 2015, by the USPTO, re U.S. Appl. No. 13/572,293".
"Final Office Action dated Mar. 7, 2013, by the USPTO, re U.S. Appl. No. 12/165,680".
"Final Office Action dated Nov. 6, 2014, by the USPTO, re U.S. Appl. No. 13/965,848".
"International Preliminary Report on Patentability, by the IPEA/US, dated Nov. 17, 2014, re PCT/US2013/054741".
"International Search Report and Written Opinion by the ISA/US, dated Dec. 16, 2014, re PCT/US2014/044813".
"International Search Report and Written Opinion by the ISA/US, dated Feb. 7, 2014, re PCT/US2013/054741".
"International Search Report and Written Opinion, dated Jan. 23, 2015, by the ISA/EP, re PCT/U52013/055257".
"Notice of Allowance dated Apr. 10, 2015, by the USPTO, re U.S. Appl. No. 29/493,861".
"Notice of Allowance dated Apr. 9, 2015, by the USPTO, re U.S. Appl. No. 13/965,848".
"Notice of Allowance dated Dec. 17, 2014, by the Canadian IP Office, re App No. 2764310".
"Notice of Allowance dated Dec. 26, 2014, by the USPTO, re U.S. Appl. No. 13/918,479".
"Notice of Allowance dated Feb. 7, 2014, by the USPTO, re U.S. Appl. No. 29/449,852".
"Notice of Allowance dated Feb. 7, 2014, by the USPTO, re U.S. Appl. No. 29/449,867".
"Notice of Allowance dated Jan. 16, 2014, by the USPTO, re U.S. Appl. No. 29/453,837".
"Notice of Allowance dated Jun. 25, 2014, by the USPTO, re U.S. Appl. No. 12/165,680".
"Notice of Allowance dated Nov. 22, 2013, by the USPTO, re U.S. Appl. No. 12/822,900".
"Notice of Allowance dated Nov. 26, 2013, by the USPTO, re U.S. Appl. No. 29/429,809".
"Notice of Allowance dated Nov. 28, 2014, by the USPTO, re U.S. Appl. No. 13/608,562".
"Office Action dated Apr. 30, 2015, by the USPTO, re U.S. Appl. No. 13/886,771".
"Office Action dated Aug. 9, 2011, by the USPTO, re U.S. Appl. No. 12/165,680".
"Office Action dated Jul. 12, 2013, by the USPTO, re U.S. Appl. No. 12/165,680".
"Office Action dated Jul. 31, 2014, by the USPTO, re U.S. Appl. No. 13/965,848".
"Office Action dated Jun. 18, 2014, by the USPTO, re U.S. Appl. No. 13/572,293".
"Office Action dated Mar. 27, 2014, by the USPTO, re U.S. Appl. No. 13/918,479".
"Oksanen, "Singer Model DLA-RPS Air operated surge anticipating electrically timed sewage relief valve," Dec. 8, 2010, XP055159354".
"Russian Office Action, issued by the Russian Patent Office, re App No. 2013500548".
"Weir SPM Safety Iron Manifold Trailer, 2008, 2 pages".
An Introduction to Rupture Disk Technology catalog, BS&B Safety Systems, 1994.
"Office Action dated May 31, 2011, from the UK IP Office, re App No. GB0812086.7".
One page showing 4" Halliburton Big Inch Clamp Connection.
SPM Flow Control, Inc., 4-Inch Integral Swivel Joint.
Two-pages of Grayloc Products, Houston, Texas 77252 showing Grayloc Connectors in Extreme Service.
"U.S. Appl. No. 60/947,738, filed Jul. 3, 2007, "Swivel Joint with Uniform Ball Bearing Requirements"".
Valve Illustration, Retsco Inc., 1992.
Venture Oilfield Services Ltd. Drawing Titled: Flowline's Safety Clamp.

(56) References Cited

OTHER PUBLICATIONS

SPM Flow Control, Inc., "Flow Control Products and Drilling Equipment for the Worldwide Petroleum Industry", Date: Jan. 8, 2007.
SPM Flow Control, Inc., Long Radius Swivel Joints, H2S, Operating and Maintenance Instructions, 1999.
SPM Flow Control, Inc., Swivel Joints, 1999, www.spmflo.com.
SPM Flow Control, Inc., High-Pressure Long Radius Swivel Joints, 2002, www.spmflo.com.
SPM Flow Control, Inc., Long Radius Swivel Joints, Operating and Maintenance Instructions, 2004.
SPM Flow Control, Inc., Long Radius Swivel Joints, Operating and Maintenance Instructions, 2006.
SPM Flow Control, Inc., Weir SPM, Long Radius Swivel Joints, 2007.
CN OA 2010800253503 dated Jun. 9, 2013 (8 pages).
SPM "Emergency Relief Valve Brochure" 1997 (4 pages).
EP Search Report dated Jan. 30, 2013 for EP09838004.1 (4 pages).
SPM Flow Control, Inc., "Flow Control Products and Drilling Equipment" brochure, Aug. 9, 2011 (28 pages).
HP70-001 OA for U.S. Appl. No. 06/419,141 dated Nov. 17, 1983 (4 pages).
HP70-006 OA for U.S. Appl. No. 08/643,239 dated Dec. 30, 1996 (11 pages).
HP70-011 NOA for U.S. Appl. No. 10/690,888 dated Aug. 29, 2005 (7 pages).
HP70-016 NOA for U.S. Appl. No. 10/833,859 dated Jul. 6, 2005 (4 pages).
HP70-016 OA for U.S. Appl. No. 10/833,859 dated Dec. 22, 2004 (5 pages).
HP70-021 NOA for U.S. Appl. No. 11/013,486 dated Feb. 12, 2007 (4 pages).
HP70-021 NOA for U.S. Appl. No. 11/414,984 dated Feb. 11, 2009 (8 pages).
HP70-021 OA for U.S. Appl. No. 11/013,486 dated Aug. 30, 2005 (12 pages).
HP70-022 NOA for U.S. Appl. No. 11/354,663 dated Jun. 29, 2010 (4 pages).
HP70-022 OA for U.S. Appl. No. 11/354,663 dated Jan. 8, 2010 (6 pages).
HP70-022 U.S. Appl. No. 60/653,014 (16 pages).
HP70-023 NOA for U.S. Appl. No. 11/638,965 dated Sep. 23, 2008 (6 pages).
HP70-023 OA for U.S. Appl. No. 11/638,965 dated Apr. 4, 2008 (10 pages).
HP70-023CA 2612397 NOA dated Dec. 20, 2012 (1 page).
HP70-029 ISR and WO for PCT/US2009/068822 dated Aug. 9, 2010 (7 pages).
HP70-029 OA for U.S. Appl. No. 12/642,541 dated Mar. 19, 2012 (15 pages).
HP70-036 ISR and WO for PCT/US2010/031738 dated Dec. 27, 2010 (7 pages).
HP70-036 NOA for U.S. Appl. No. 12/763,786 dated May 16, 2012 (6 pages).
HP70-036 OA for U.S. Appl. No. 12/763,786 dated Oct. 11, 2011 (9 pages).
HP70-036 U.S. Appl. No. 61/170,917 (9 pages).
HP70-036A OA for U.S. Appl. No. 13/608,562 dated Sep. 13, 2013 (12 pages).
HP70-036EP Extended SR for EP10767632.2 dated Mar. 14, 2013 (6 pages).
HP70-036EP SR for EP10767632.2 dated Mar. 14, 2013 (6 pages).
HP70-037 ISR and WO for PCTUS2010/037156 dated Jan. 13, 2011 (8 pages).
HP70-037 NOA for U.S. Appl. No. 12/793,194 dated Feb. 19, 2013 (10 pages).
HP70-037 OA for U.S. Appl. No. 12/793,194 dated Oct. 25, 2012 (8 pages).
HP70-039EP Extended SR for EP10784052.2 dated Jul. 4, 2013 (7 pages).
HP70-039 FOA for U.S. Appl. No. 10/822,900 dated Aug. 16, 2013 (15 pages).
HP70-039 ISR and WO for PCT/US2010/039834 Feb. 8, 2011 (6 pages).
HP70-039 OA for U.S. Appl. No. 12/822,900 dated Dec. 6, 2012 (20 pages).
HP70-039 U.S. Appl. No. 61/220,067 (12 pages).
HP70-072 IPRP for PCT/US2012/050376 dated Jul. 15, 2013 (28 pages).
HP70-072 ISR and WO for PCT/US2012/050376 dated Oct. 26, 2012 (2 pages).
HP70-072 U.S. Appl. No. 61/522,234 (23 pages).
HP70-714 Design U.S. Appl. No. 29/429,909 (4 pages).
HP70-714 IN Exam Report for IN Design 251691 dated Jun. 26, 2013 (2 pages).
HP70-715 Design U.S. Appl. No. 29/449,852 (7 pages).
HPHP70-716 Design U.S. Appl. No. 29/449,867 (8 pages).
HP70-720 Design U.S. Appl. No. 29/453,837 (8 pages).
BJ 285959—3 inch 15,000 PSI Popoff Valve, Mar. 26, 2004 (1 page).
Harrisburg, Inc., "Reset Relief Valves" brochure, (c) 1982) (2 pages).

* cited by examiner

SWIVEL JOINT WITH UNIFORM BALL BEARING REQUIREMENTS

This application claims priority to and the benefit of U.S. patent application Ser. No. 12/165,680, filed Jul. 1, 2008, which claims priority to U.S. Provisional Patent Application No. 60/947,738, filed Jul. 3, 2007, both of which are incorporated herein by reference in their entirety.

BACKGROUND

1. Technical Field

This invention relates in general to swivels joints for high pressure well service applications and, in particular, to an improved system, method, and apparatus for swivel joints having uniform ball bearing requirements for all bearing races.

2. Description of Related Art

High pressure well service applications require the use of swivel joints to interconnect various plumbing configurations. A swivel joint has male and female connectors that are joined and sealed, but which permit swivel action between them. Circumferential bearing seats are formed in the male and female connectors to capture ball bearings therebetween to facilitate the swiveling action. Swivel joints are required to perform under extreme conditions, such as handling fluids that contain abrasives that cause erosion of the joint components, high pressures, and extreme temperatures. Although there are workable designs available in the industry. An improved swivel joint design would be desirable.

SUMMARY

Embodiments of a system, method, and apparatus for a swivel joint having uniform ball bearing requirements for all bearing races are disclosed. The swivel joint has a male connector and a female connector that coaxially interconnect and swivel relative to each other while still maintaining a high pressure seal. Each connector has three bearing races to form three sets of bearing races, each of which supports the same number of ball bearings. The circumferences of the main races are enlarged by less than the diameter of one ball, so it is impossible to add another ball to the coupled male and female connectors of the swivel joint.

For example, the main and center male connector bearing races are formed at one diameter, while the third bearing race is formed at a larger diameter. The female races are formed at complementary configurations. In addition to providing diametric and circumferential dimensional changes, this design also provides an increase in wall thickness for greater erosion resilience.

An increased step in diameter may be formed on the outer diameter of the male connector between the races, with a complementary step in diameter formed on the inner diameter of the female connector between its races. This design results in more support around the main ball races that are closest to the seal ring. This configuration also produces more even distribution of loads and stresses throughout all of the ball races, and provides extended life of the ball races.

One embodiment of the invention also is provided with greater axial separation between the various sets of ball races compared to conventional designs. For example, the axial distance between each set of races is increased. This wider stance between ball races results in a more stable ball race assembly and provides better ball race loading and longer ball race life.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of this disclosure which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments and therefore are not to be considered limiting of its scope as the invention may admit to other equally effective embodiments.

DETAILED DESCRIPTION

Figure 1:
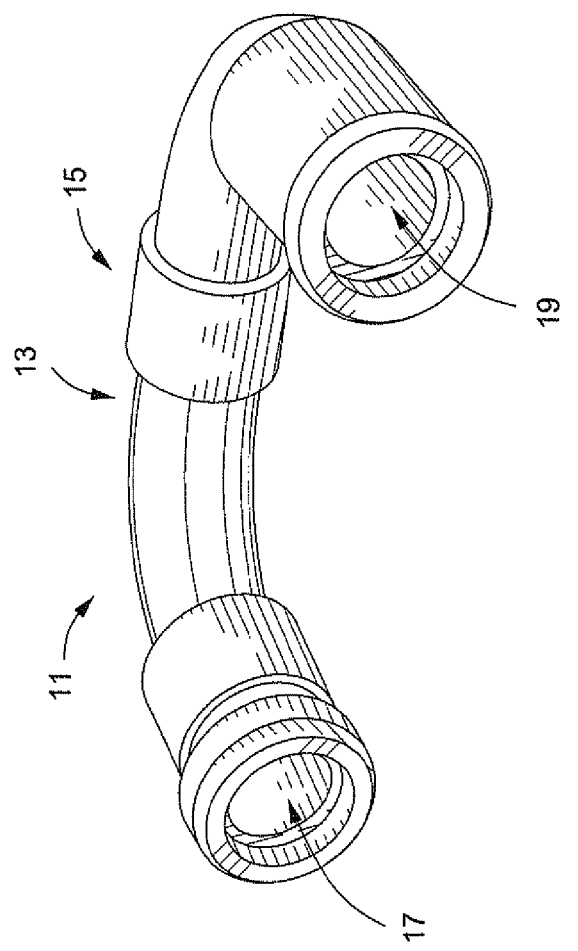
FIG. 1 is an isometric view of one embodiment of a swivel joint constructed in accordance with the invention.
Figure 2:
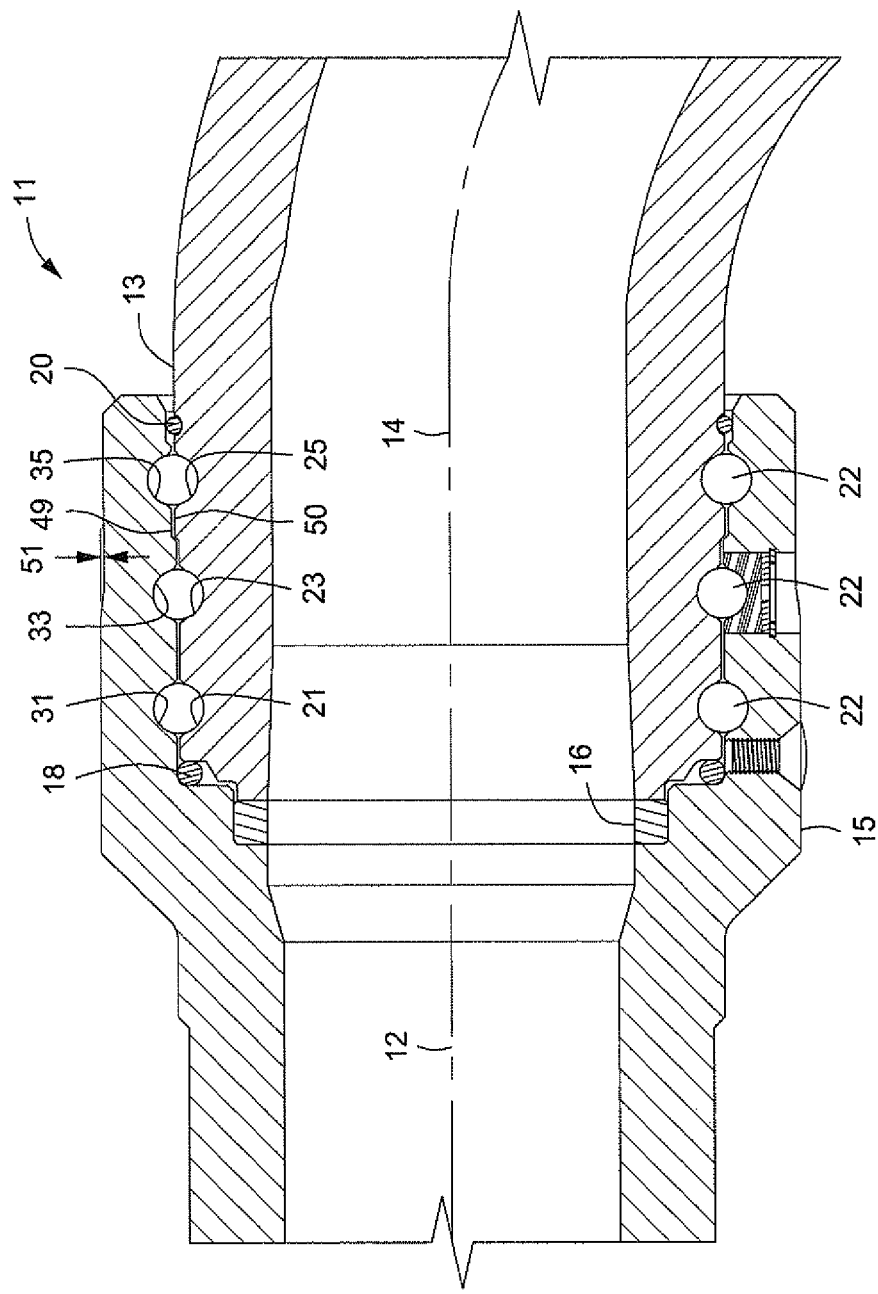
FIG. 2 is a sectional view of the swivel joint of FIG. 1 and is constructed in accordance with the invention.

Referring to FIGS. 1-6, embodiments of a system, method, and apparatus for swivel joints having uniform ball bearing requirements for all bearing races are disclosed. As shown in FIGS. 1 and 2, one type of swivel joint 11 comprises a male connector 13 and a female connector 15 that coaxially interconnect along central axes 12, 14 thereof. The swivel joint 11 also includes connectors 17, 19 for connecting the swivel joint to other well service components (not shown). The swivel joint permits the male and female connectors 13, 15 to swivel about the axes 12, 14 relative to each other while still maintaining a high pressure seal therebetween.

Figure 3:
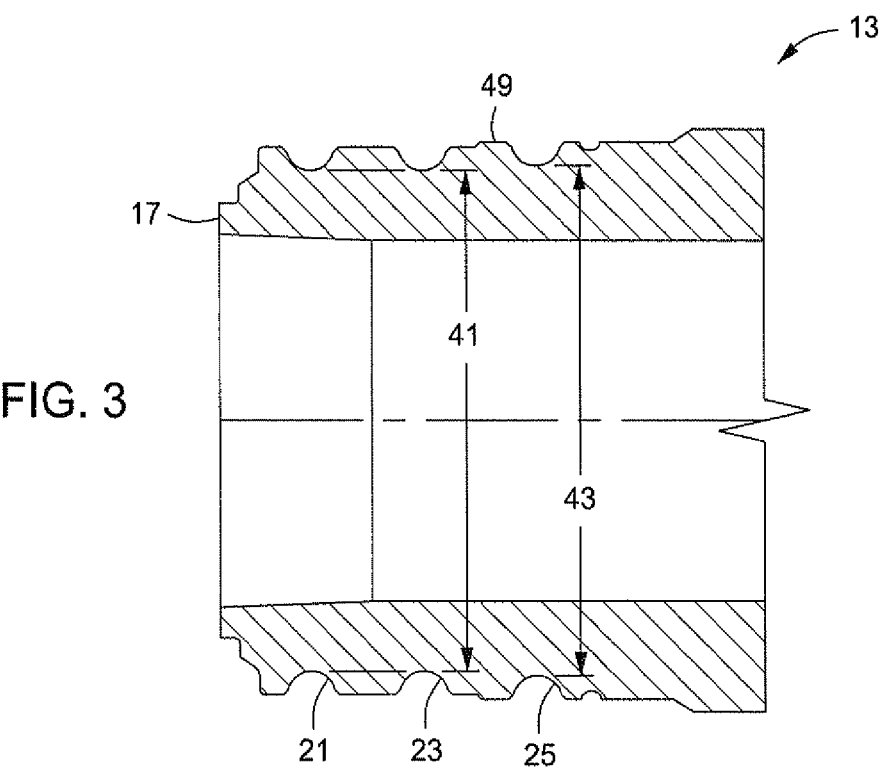
FIG. 3 is a sectional view of one embodiment of a male connector for a swivel joint and is constructed in accordance with the invention.
Figure 4:
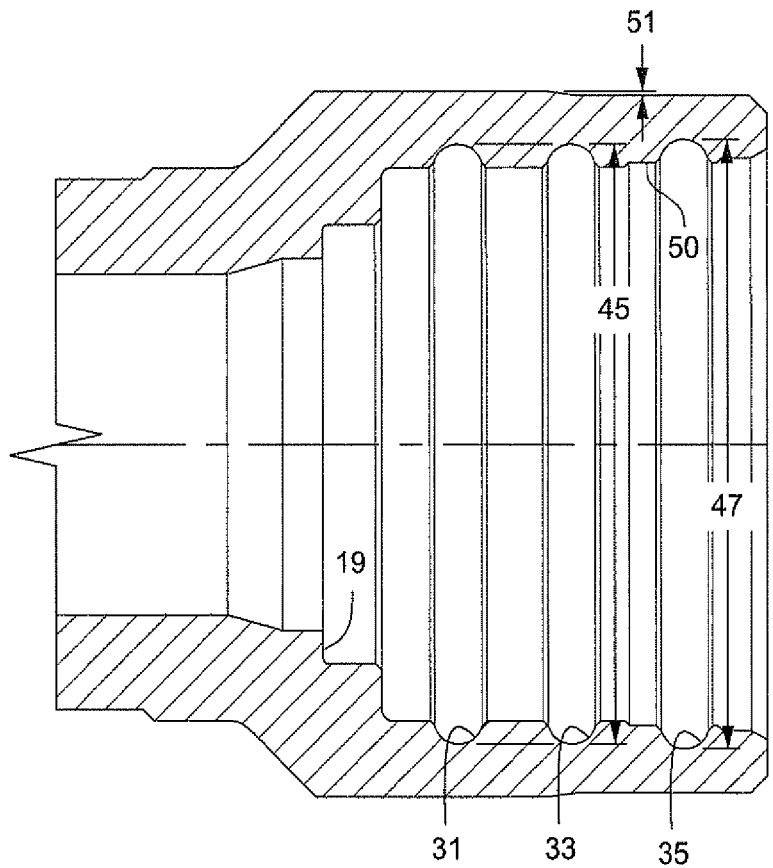
FIG. 4 is a sectional view of one embodiment of a female connector for a swivel joint and is constructed in accordance with the invention.

FIGS. 3 and 4 depict enlarged sectional views of one embodiment of male and female connectors 13, 15, respectively, such as for 3-inch diameter components rated at a working pressure of 15,000 psi. A main seal ring 16 (FIG. 2) for the swivel joint 11 is located between distal end 17 (FIG. 3) of male connector 13, and proximal end 19 (FIG. 4) of female connector 15. As shown in FIG. 2, an O-ring 18 and dust seal 20 also may be provided between connectors 13, 15.

Male connector 13 also has three arcuate recesses or bearing races 21, 23, 25, that are coaxial with and complementary to three arcuate recesses or bearing races 31, 33, 35 located on female connector 15. Thus, when male and female connectors 13, 15 are mated together, three sets of bearing cavities are formed: main set races or cavity formed by 21, 31; center set or cavity formed by races 23, 33, and support set cavity formed by races 25, 35, each of which supports a plurality of ball bearings or balls 22.

In one embodiment, each set of races contains the same number of balls 22. For example, each set of races may be provided with a total of 35 balls, with each ball having a diameter of ⅜ inch. However, the sets of races are not all the same size. For example, although main set races 21, 31 and center set races 23, 33 may be provided with the same diameters, support set races 25, 35 may be provided with larger diameters. With respect to some conventional designs having small main set races, this design may be accomplished by enlarging the diameter and circumference of main set races 21, 31 by a sufficient distance to almost accommodate another ball (e.g., approximately ¾ to ⅞ of the diameter of one ball). Since the circumference of main set races 21, 31 are enlarged by less than the diameter of one ball, it is impossible to add another ball to the coupled male and female connectors 13, 15 of swivel joint 11.

For example, in the embodiment of FIG. 3, the male connector 13 at bearing races 21, 23 is formed at an outer diameter 41 of about 3.843 inches, while the male connector 13 at bearing race 25 is formed at an outer diameter 43 of about 3.903 inches. In a complementary configuration, the female connector 15 at bearing races 31, 33 (FIG. 4) may be formed at an inner diameter 45 of about 4.60 inches, while at bearing race 35, it may be formed at an inner diameter 47 of about 4.66 inches.

In addition to providing diametral and circumferential dimensional changes, this design also provides an increase in wall thickness (i.e., radial direction). In one embodiment, the wall thickness of the male connector 13 is increased by about 13.5% for greater erosion resilience therethrough. As shown in FIGS. 2-4, a step 49 in diameter (i.e., radial thickness of the wall) may be formed on a band 60 on the outer diameter of male connector 13 between races 23, 25, with a complementary shaped step 50 in diameter formed on a band 61 in the inner diameter of female connector 15 between races 33, 35. Step 49 creates on band 60 a larger outer diameter portion joining male bearing race 25 and a smaller outer diameter portion joining male bearing race 23. Step 50 creates on band 50 a smaller inner diameter portion joining female bearing race 33 and a larger inner portion joining the female bearing race 35.

One embodiment of the invention also is provided with greater axial separation between the various sets of ball races compared to conventional designs. For example, on the male connector 13 (FIG. 3), the axial distance between ball races 21 and 23 is increased to at least about 0.88 inches, as is the axial distance between ball races 23 and 25. Complementary dimensions are formed on the female connector 15. This wider stance between ball races results in a more stable ball race assembly and provides better ball race loading and longer ball race life.

Referring now to FIGS. 2 and 4, the female connector 15 may be provided with an outer diameter configuration that includes a step 51 in radial thickness of the wall. For example, in the embodiment shown, the step 51 is located adjacent the center race 33. The wall of connector 15 is thicker and has a larger diameter (e.g., approximately 5.41 inches) about main race 31, and a smaller diameter (e.g., approximately 5.34 inches) about support race 35. This design results in more support around the main ball races that are closest to the seal ring 16 (FIG. 2). This configuration also produces more even distribution of loads and stresses throughout all of the ball races, and provides extended life of the ball races.

Figure 5:
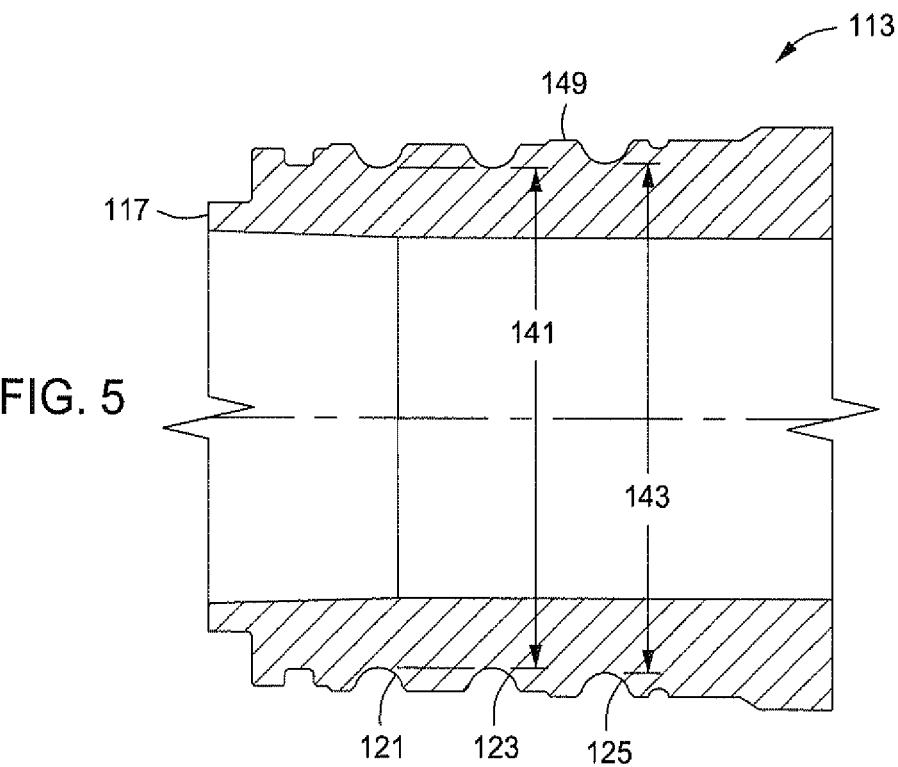
FIG. 5 is a sectional view of another embodiment of a male connector for a swivel joint and is constructed in accordance with the invention.
Figure 6:
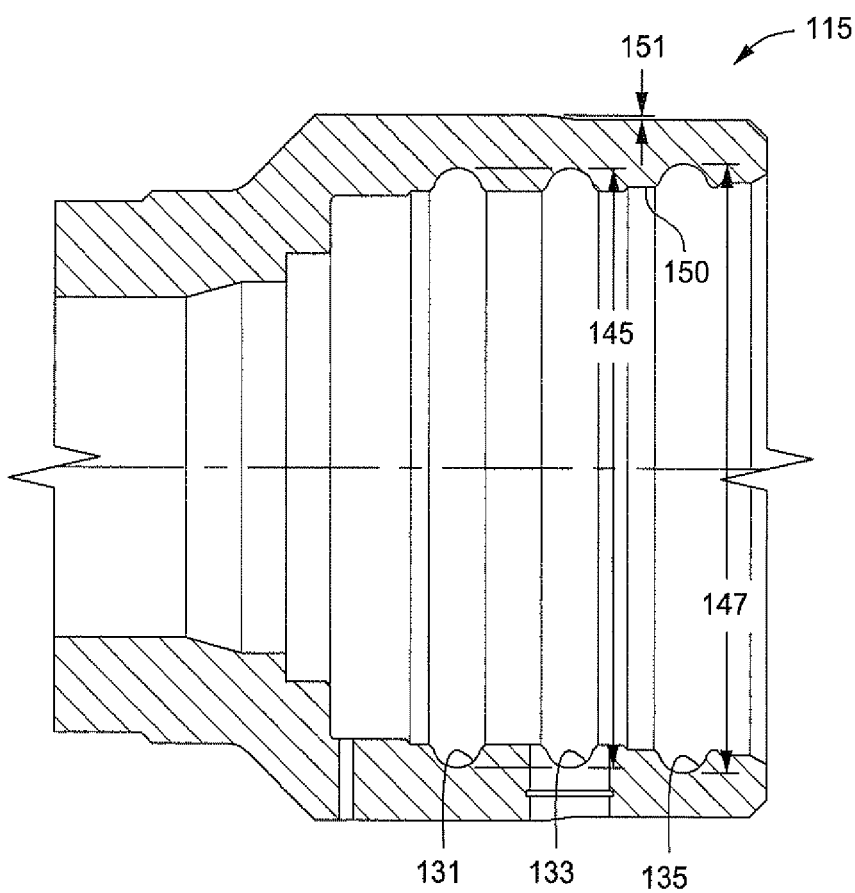
FIG. 6 is a sectional view of another embodiment of a female connector for a swivel joint and is constructed in accordance with the invention.

Referring now to FIGS. 5 and 6, another embodiment of male and female connectors 113, 115, such as for 4-inch diameter components rated at a working pressure of 10,000 psi is shown. This embodiment and the previously described embodiment share many features and elements, including the requirement that each race contain the same number of balls. For example, each set of races may be provided with a total of 32 balls, with each ball having a diameter of 112 inch.

Similarly, the sets of races are not all the same size. The main races 121, 131 and center races 123, 133 may be provided with the same respective diameters, and support races 125, 135 may be provided with larger respective diameters. This design may be accomplished by enlarging the diameter and circumference of main races 121, 131 by a sufficient distance to almost accommodate another ball. Since the circumference of the main races 121, 131 are enlarged by less than the diameter of one ball, it is impossible to add another ball to the coupled male and female connectors 113, 115 of the swivel joint.

For example, in the embodiment of FIG. 5, the male connector races 121, 123 are formed at a diameter 141 of about 4.637 inches, while support race 125 is formed at a diameter 143 of about 4.727 inches. In a complementary configuration, the female connector races 131, 133 (FIG. 6) maybe formed at a diameter 145 of about 5.647 inches, while support race 135 maybe fanned at a diameter 147 of about 5.737. This design also provides an increase in wall thickness of about 22.7% in one embodiment of the male connector 113. A step 149 in diameter (i.e., radial thickness of the wall) may be formed on the outer diameter of male connector 113 between races 123, 125, with a complementary step 150 in diameter formed on the inner diameter of female connector 115 between races 133, 135.

The female connector 115 also may be provided with an outer diameter configuration that includes a step 151 (FIG. 6) in radial thickness of the wall. For example, in the embodiment shown, the step 151 is located adjacent the center race 133. The wall of connector 115 is thicker and has a larger diameter (e.g., approximately 6.56 inches) about main race 131, and a smaller diameter (e.g., approximately 6.44 inches) about support race 135.

While the invention has been shown or described in only some of its forms, it should be apparent to those skilled in the art that it is not so limited, but is susceptible to various changes without departing from the scope of the invention.

What is claimed is:

1. A swivel joint, comprising:
a male connector having a central axis, a terminal end, a male main bearing race, a male center bearing race on a side of the male main bearing race opposite from the terminal end, and a male support bearing race on a side of the male center bearing race opposite the male main bearing race, the male support bearing race having a diameter greater than diameters of the male main bearing race and male center bearing race;
a female connector coaxially interconnected with the male connector along the central axis, a distal end of the male connector being inserted into the female connector, the female connector having female main, female center, and female support bearing races that respectively form cavities with the male main, male center, and male support bearing races, such as to define main, center, and support bearing cavities, the female support bearing race being closer to a rim of the female connector than the female main bearing race;
a step circumscribing the male connector between the support and center bearing races that defines a radial change of the male connector;

a same number of balls in each of the main, center, and support bearing cavities, the same number of balls having a same diameter, wherein each of the main, center, and support bearing cavities is filled with the same number of balls to a capacity such that no additional ball of the same diameter can be added to each of the main, center, and support bearing cavities in addition to the same number of balls.

2. The swivel joint according to claim 1, wherein the balls of each of the bearing cavities contains a total of 35 balls.

3. The swivel joint according to claim 1, wherein the outer diameter of the male connector adjacent the male main bearing race is substantially the same as the outer diameter of the male connector adjacent the male center bearing race.

4. The swivel joint according to claim 1, wherein each bearing cavity contains a total of 35 balls, with each ball having a diameter of ⅜ inch.

5. The swivel joint according to claim 1, wherein each bearing cavity contains a total of 32 balls, with each ball having a diameter of ½ inch.

6. The swivel joint according to claim 1, wherein:
a circumference of the male connector adjacent the male support bearing race is greater than a circumference of the male connector adjacent the male center bearing race; and
a difference between the circumference of the male connector adjacent the male support bearing race and a circumference of the male connector adjacent the male center bearing race is less than a diameter of any of the balls.

7. The swivel joint according to claim 1, wherein a circumference of the male connector adjacent the male main bearing race is substantially the same as a circumference of the male connector adjacent the male center bearing race, a circumference of the male connector adjacent the male support bearing race is greater than the circumference of the male connector adjacent the male main bearing race and the circumference of the male connector adjacent the male center bearing race, and a difference between the circumference of the male connector adjacent the male support bearing race and the circumference of the male connector adjacent the male main and male center bearing races is less than a diameter of any of the balls.

8. The swivel joint according to claim 1, wherein the male connector has a radial wall thickness adjacent the male main bearing race that is less than a radial wall thickness adjacent the male support bearing race.

9. The swivel joint according to claim 1, wherein:
each of the male center and the male support bearing races is an arcuate recess; and
the male connector has a cylindrical annular band between the male center and male support bearing races, the annular band having a step formed on an outer surface thereof, defining for the annular band a larger outer diameter portion and a smaller outer diameter portion, the larger outer diameter portion joining the male support bearing race.

10. The swivel joint according to claim 1, wherein: the female center and female support bearing races are arcuate recesses; and
the female connector has a cylindrical annular band between the female center and female support bearing races, the annular band having a step formed on an inner surface thereof, defining for the annular band of the female connector a larger inner diameter portion and a smaller inner diameter portion, the larger inner diameter portion joining the female support bearing race.

11. The swivel joint according to claim 10, wherein the female connector has an outer surface with a larger outer diameter portion radially outward from the female main bearing races and a smaller outer diameter portion radially outward from the female support bearing race.

12. The swivel joint according to claim 1, wherein the swivel joint further comprises additional connectors opposite the male and female connectors for connecting the swivel joint to other well service components.

13. The swivel joint according to claim 12, wherein said other well service components comprise 3-inch diameter components rated at a working pressure of 15,000 psi.

14. The swivel joint according to claim 12, wherein said other well service components comprise 4-inch diameter components rated at a working pressure of 10,000 psi.

15. The swivel joint according to claim 1, further comprising a main seal ring located between the distal end of the male connector, and a proximal end of the female connector, and a seal between the male and female connectors.

16. A swivel joint, comprising:
a male connector having a central axis and three bearing races including a male main bearing race, a male support bearing race having a diameter greater than a diameter of the male main bearing race, and a male center bearing race having a diameter less than a diameter of the male support bearing race and located between the male main and the male support being races, the male main bearing race being closer to a distal end of the male connector than the male support bearing race and the male center bearing race, and the male connector having a larger outer diameter adjacent the male support bearing race than adjacent the male main and center bearing races;
a female connector coaxially interconnected with the male connector along the central axis, and having female main, female center, and female support bearing races that respectively form cavities with the male main, male center, and male support bearing races, such as defining main, center, and support bearing cavities, the female support bearing race being closer to a rim of the female connector than the female main bearing race, the female connector having a same inner diameter adjacent the female main bearing race and the female center bearing race, and the female connector having a larger inner diameter adjacent the female support bearing race than adjacent the female main and center bearing races;
a same number of balls in each of the main, center, and support bearing cavities, the same number of balls having a same diameter, wherein each of the main, center, and support bearing cavities is filled with the same number of balls to a full capacity such that no additional ball of the substantially same diameter can be added to each of the main, center, and support bearing cavities in addition to the same number of balls; and
wherein a circumference of the male connector adjacent the male main bearing race is substantially the same as a circumference of the male connector adjacent the center bearing race, and a circumference adjacent the male support bearing race is greater than the circumference of the male connector adjacent the main and center bearing races by an amount less than a diameter of any of the balls.

17. The swivel joint according to claim 16, wherein the male connector has a cylindrical annular band between the male center and male support bearing races, each of the male center and male support bearing races being an arcuate recess, the annular band having a step formed on an outer surface thereof, defining for the annular band a larger outer diameter portion and a smaller outer diameter portion, the larger outer diameter portion joining the male support bearing race.

18. The swivel joint according to claim 16, wherein the female connector has a cylindrical annular band between the female center and female support bearing races, each of the female center and female support bearing races being an arcuate recess, the annular band having a step formed on an inner surface thereof, defining for the annular band of the female connector a larger inner diameter portion and a smaller inner diameter portion, the larger inner diameter portion joining the female support bearing race.

19. The swivel joint according to claim 16, wherein the female connector has an outer surface with a larger outer diameter portion radially outward from the female main and female center bearing races than a smaller outer diameter portion radially outward from the female support bearing race.

20. A swivel joint, comprising:
- a male connector having a central axis, a male main bearing race, a male support bearing race having a diameter greater than a diameter of the male main bearing race, and a male center bearing race having a diameter the same as the diameter of the male main bearing race and located between the male main and the male support bearing races, the male main bearing race being closer to a distal end of the male connector than the male support bearing race;
- a radial transition circumscribing the male connector so that the radius of the male connector adjacent the male support bearing race is greater than the radius of the male connector adjacent the male center bearing race;
- a female connector coaxially interconnected with the male connector along the central axis, and having female main, female center, and female support bearing races that respectively form cavities with the male main, male center, and male support bearing races, such as defining main, center, and support bearing cavities, the female support bearing race being closer to a rim of the female connector than the female main bearing race;
- a same number of balls in each of the main, center, and support bearing cavities, the same number of balls having a uniform diameter, wherein each of the main, center, and support bearing cavities is filled with the same number of balls to a full capacity that no additional ball of the same uniform diameter can be added to each of the main, center, and support bearing cavities in addition to the same number of balls; and
- wherein the male connector adjacent the male support bearing race has a circumference that is greater than a circumference of the male connector adjacent the male center bearing race by an amount less than the ball diameter.

* * * * *